United States Patent
Bahali et al.

(10) Patent No.: US 7,509,506 B2
(45) Date of Patent: Mar. 24, 2009

(54) HIERARCHICAL SYSTEM AND METHOD FOR MANAGING POWER USAGE AMONG SERVER DATA PROCESSING SYSTEMS

(75) Inventors: Sumanta K. Bahali, Cary, NC (US); Warren D. Bailey, Pittsboro, NC (US); Jimmy G. Foster, Sr., Morrisville, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 11/148,934

(22) Filed: Jun. 9, 2005

(65) Prior Publication Data

US 2006/0282688 A1  Dec. 14, 2006

(51) Int. Cl.
  G06F 1/00  (2006.01)
  G06F 1/26  (2006.01)
(52) U.S. Cl. .............. 713/300; 713/310; 713/320; 713/324; 709/208; 709/209
(58) Field of Classification Search ........... 713/300, 713/310, 320, 324, 340; 714/100; 709/208, 709/209
See application file for complete search history.

(56) References Cited

U.S. PATENT DOCUMENTS

| | | |
|---|---|---|
| 5,249,297 A | 9/1993 | Brockmann et al. |
| 5,251,320 A * | 10/1993 | Kuzawinski et al. ........ 713/324 |
| 5,307,409 A * | 4/1994 | Driscoll ........................... 380/2 |
| 5,398,244 A | 3/1995 | Mathews et al. |
| 5,483,656 A | 1/1996 | Oprescu et al. |
| 5,579,524 A | 11/1996 | Kikinis |
| 5,652,893 A | 7/1997 | Ben-Meir et al. |
| 5,719,800 A | 2/1998 | Mittal et al. |
| 5,724,592 A | 3/1998 | Garner |
| 5,752,050 A * | 5/1998 | Hernandez et al. .......... 713/330 |
| 5,764,913 A | 6/1998 | Jancke et al. |
| 5,787,294 A | 7/1998 | Evoy |
| 5,987,614 A * | 11/1999 | Mitchell et al. ............. 713/300 |
| 6,029,006 A | 2/2000 | Alexander et al. |
| 6,266,735 B1 | 7/2001 | Isobe |
| 6,301,527 B1 | 10/2001 | Butland et al. |
| 6,377,874 B1 * | 4/2002 | Ykema ....................... 700/286 |
| 6,477,483 B1 | 11/2002 | Scarlat et al. |
| 6,525,895 B2 | 2/2003 | Wakui |
| 6,564,274 B1 | 5/2003 | Heath et al. |
| 6,564,328 B1 | 5/2003 | Grochowski |
| 6,564,332 B1 | 5/2003 | Nguyen et al. |
| 6,643,771 B2 | 11/2003 | Tsushima et al. |
| 6,701,446 B2 | 3/2004 | Tsern et al. |
| 6,708,278 B2 | 3/2004 | Howard et al. |
| 6,802,014 B1 * | 10/2004 | Suurballe ..................... 713/300 |
| 6,836,849 B2 | 12/2004 | Brock et al. |
| 6,931,553 B1 | 8/2005 | Plante et al. |
| 2002/0007463 A1 | 1/2002 | Fung |
| 2002/0062454 A1 | 5/2002 | Fung |

(Continued)

*Primary Examiner*—Mark Connolly
(74) *Attorney, Agent, or Firm*—Cynthia S. Byrd; Dillon & Yudell LLP (57) ABSTRACT

A hierarchical power management system comprises first and second power management controllers, a power management command combination element, a power management command terminator, a power-managed data processing system element, and a power management bus coupled between the power management controllers, power management command combination element, and power management command terminator.

20 Claims, 8 Drawing Sheets

U.S. PATENT DOCUMENTS

| | | |
|---|---|---|
| 2003/0037268 A1 | 2/2003 | Kistler et al. |
| 2003/0055969 A1 | 3/2003 | Begun et al. |
| 2003/0061448 A1 | 3/2003 | Rawson, III |
| 2003/0065961 A1 | 4/2003 | Koenen |
| 2003/0131119 A1 | 7/2003 | Noonan et al. |
| 2005/0102544 A1 | 5/2005 | Brewer et al. |
| 2006/0168416 A1 | 7/2006 | Kessels et al. |
| 2007/0005994 A1 | 1/2007 | Bahali et al. |

* cited by examiner

HIERARCHICAL SYSTEM AND METHOD FOR MANAGING POWER USAGE AMONG SERVER DATA PROCESSING SYSTEMS

CROSS-REFERENCE TO RELATED APPLICATIONS

The present application is related to the following United States Patent Applications, which are assigned to the assignee hereof and incorporated herein by reference in their entireties and for all purposes:

U.S. patent application Ser. No. 11/148,579 entitled, "DISTRIBUTED SYSTEM AND METHOD FOR MANAGING POWER USAGE AMONG SERVER DATA PROCESSING SYSTEMS," naming Sumanta K. Bahali, Warren D. Bailey, Jimmy G. Foster, Sr., and Gregory D. Sellman as joint inventors, and filed concurrently herewith.

U.S. patent application Ser. No. 11/148,692 entitled, "POWER MANAGEMENT SERVER AND METHOD FOR MANAGING POWER CONSUMPTION," naming Sumanta K. Bahali, Warren D. Bailey, Jimmy G. Foster, Sr., and Gregory D. Sellman as joint inventors, and filed concurrently herewith.

U.S. patent application Ser. No. 11/148,581 entitled, "POWER-MANAGED SERVER ANT) METHOD FOR MANAGING POWER CONSUMPTION," naming Sumanta K. Bahali, Warren D. Bailey, Jimmy G. Foster, Sr., and Gregory D. Sellman as joint inventors, and filed concurrently herewith.

U.S. patent application Ser. No. 11/148,580 entitled, "SYSTEM AND METHOD FOR MANAGING POWER USAGE OF A DATA PROCESSING SYSTEM SUBSYSTEM," naming Sumanta K. Bahali, Warren D. Bailey, Jimmy G. Foster, Sr., and Gregory D. Sellman as joint inventors, and filed concurrently herewith.

BACKGROUND

1. Technical Field

Embodiments of the present invention relate generally to power allocation within a data processing system and more particularly to a hierarchical system and method for managing power usage among server data processing systems.

2. Description of the Related Art

Recently, the development of data processing systems (e.g., computer systems) has begun to focus on the amount of electrical power consumed rather than solely on more traditional aspects such as the volume of data stored, the speed at which operations are completed, or the flexibility of the types of operations which may be performed. This is true not only in the context of mobile data processing system devices where the weight and charge/discharge cycle time of portable power sources such as battery cells is critical, but also in the context of desktop or large data processing systems not intended to be user-portable.

In the larger data processing system context, a reduction in power consumption may be necessary to achieve eligibility for certain environmental impact standards or labels such as the "Energy Star" rating system established by the United States Department of Energy and the Environmental Protection Agency or merely to reduce the cost of operating a data processing system associated with system power. The issue of power management is even more critical in larger scale data processing systems such as supercomputers, parallel processing data processing systems (e.g., massively parallel processing systems), server data processing system "farms", data centers, and rack servers.

A rack server is a data processing system including a storage rack element into which one or more server data processing system modules are inserted. In a typical configuration, a single power input or source (e.g., a conventional wall-mounted power outlet) is coupled to each storage rack element with power being distributed or subdivided among the elements of the rack as needed (e.g., via a power distribution unit or "PDU"). A server farm or data center is an association of multiple server data processing systems (e.g., rack servers) as part of an enterprise.

The available space of a rack server is typically defined in terms of rack units or "U" with storage rack elements being available in a variety of sizes (e.g., 14U, 25U and 42U). Conventional server data processing system modules are measured in terms of the number of rack units they occupy, with rack density being determined by the number of "U" occupied within a storage rack element. Until recently, a conventional rack server would include a 42U rack having 6 7U-sized server data processing system modules. More modem rack servers may frequently include 21 2U-sized server data processing system modules, 42 1U-sized server data processing system modules, or even 84 half rack unit-sized or "blade" server data processing system modules.

Each server data processing system module typically includes a separate power supply element and consequently, as the number of modules in a rack server increases, the amount of power consumed may increase disproportionately as compared with a rack server including a smaller number of larger modules. Electrical power consumption in such power-dense rack servers may be so great that a single power input/source, server farm, or data center may be unable to provide sufficient power to operate all modules as needed.

In a conventional data processing system, power management is frequently accomplished by reducing rail or source voltages applied to a processing element (e.g., a central processing unit) or the frequency of a clock signal applied to such a processing element in response to a user selection of a particular power "mode" (e.g., maximum system performance or minimum power consumption mode) or following the detection of an external event such as the application or removal of an external (e.g., alternating current) power source. While such power management techniques may result in a reduction in the amount of power consumed, they either require explicit user input which may not accurately reflect the power consumption needs of a data processing system affected or operate completely independently of data processing system power requirements based upon external events. Moreover, such power management techniques provide no manner to coordinate the power consumption of multiple data processing systems which depend on a single power input or source or of multiple subsystems of a single data processing system.

SUMMARY

A hierarchical system and method for managing power usage among server data processing systems are provided herein. According to one embodiment, a hierarchical power management system is provided which comprises first and second power management controllers, a power management command combination element, a power management command terminator, a power-managed data processing system element, and a power management bus coupled between the power management controllers, power management command combination element, and power management command terminator.

The foregoing is a summary and thus contains, by necessity, simplifications, generalizations and omissions of detail; consequently, those skilled in the art will appreciate that the summary is illustrative only and is not intended to be in any way limiting. As will also be apparent from the accompanying description, the operations disclosed herein may be implemented in a number of ways including implementation in hardware, software, firmware, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of similar reference symbols in different drawings is intended to indicate similar or identical items.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a hierarchical system and method for managing power usage among one or more server data processing systems (e.g., a server farm or data center including a number of rack server data processing systems). Within the present description, the term "power" is intended to indicate electrical power or data or a factor which represents or specifies electrical power or is proportional to electrical power (e.g., current, voltage, duty cycle, or the like). Embodiments of the present invention further provide a method and apparatus for oversubscribing power management infrastructures (e.g., power supply, cooling, process control and/or throttling elements) among a plurality of server data processing systems at different hierarchical levels as well as the distribution of power management commands within a single data processing system.

According to one embodiment, a hierarchical power management system is provided which comprises first and second power management controllers, a power management command combination element, a power management command terminator, a power-managed data processing system element, and a power management bus coupled between the first power management controller, second power management controller, power management command combination element, and power management command terminator. A power management controller may exist at various hierarchical levels within the described system and may be utilized to generate and issue power management commands and/or to perform power management operations based upon power management data (e.g., data specifying current power usage by various system elements, power management capability data corresponding to such elements, and/or data specifying a power usage threshold for the system or a subset thereof).

A power management command combination element or "concentrator" in the presently described embodiment is utilized to combine or separate power management command bit signals and/or power management commands specified by such signals and may similarly exist at various hierarchical levels within the described system. According to one embodiment, a power management command combination element is provided at the highest level in a system (e.g., a rack server data processing system or component server data processing system module thereof), where for example, such a system contains multiple processing nodes or control blocks at the highest hierarchical level. Such configurations may be implemented where a copy of a memory controller or hub is integrated with a system processing element in a single device package, where multiple system processors are provided within a single server data processing system or module, and/or where multiple server data processing system nodes or modules are provided at the same hierarchical level within a single (e.g., rack) server.

In one embodiment, a power management command combination element may be used to replicate a power management command bit signal value to a number of (highest hierarchical level) nodes or processing blocks with each such node or block further replicating and distributing a received signal down the hierarchy as described herein. In another embodiment, a power management command combination element is provided to couple or combine power management command bit signal values and/or corresponding power management commands originating at power management controllers at different hierarchical levels within the described system (e.g., at a server farm or data center level and a rack server or server module level). In the described embodiment, a power management command combination element is configured to compare the power usage reductions corresponding to received signals or power management commands and to in turn generate and/or issue a combined power management command or commands to perform corresponding power management operations. In one embodiment, a combined power management command or associated signal is generated by selecting the most power usage-restrictive command or signal from a number of such signals or commands.

In the described embodiments, a power management command terminator or "end point controller" is utilized to effect a requested power management command or operation and/or to place a data processing system element in a specified power management state or level. Such commands may then be distributed to all elements at a similar or lower hierarchical level. In one embodiment, such functionality is implemented directly, by throttling or controlling the operation of an attached power-managed data processing system element. For example, a memory controller or hub may be used to directly control the throttling of an associated or attached memory bus. In another embodiment, existing power management functionality may be utilized where available such that a power-managed device or element need not be aware of the hierarchical power management protocol described herein. For example, most system processors are provided with a proprietary means to throttle performance and power usage. Accordingly, a power management command terminator designed for a specific family of system processors may simply be used to convert power management commands generated according to an embodiment of the present invention into proprietary processor throttling commands.

The power management bus coupled between other elements of the hierarchical system as previously described provides a communication medium by which power management data may be collected and power management commands may be distributed. According to one embodiment of the present invention, a power management bus comprises a single signal wire configured to transmit power management command bit signals unidirectionally from higher (e.g., server farm or data center) levels to lower (e.g., data processing system element or device) levels. In other embodiments of the present invention, provision is made for more additional input and output ports for each device family (e.g., power controller, power management command combination element, and power management command terminator). For example, a power controller in a redundant mode of one embodiment is configured to distribute two copies of a power management command bit signal down to the same device in case one link fails. Similarly, multiple power management busses or segments thereof may be provided in a redundant fashion for increased reliability.

In one embodiment, power management infrastructures (e.g., power supply, cooling, process control and/or throttling elements) of an entire server farm or data center are oversubscribed and managed using server farm-level power management controller. In a more complex embodiment, a power controller and power management command combination element are provided for each group of server data processing systems (e.g., each rack server and/or group of tower servers) which likewise oversubscribe local power management infrastructures. Irrespective of the distribution of hierarchical elements within a given system, communication (e.g., of power management data and/or commands) may be direct from a power management controller to a power management command terminator or controlled system element, or indirect.

According to one embodiment, each of a group of server data processing systems (e.g., a rack server) includes a power management communication port which may be coupled externally to another member of the group in a serial or "daisy chain"fashion via a communication medium (e.g., a power management bus or component portion thereof). Internally, each power management communication port is coupled to its corresponding server data processing system in a similar hierarchical manner. More specifically, in one embodiment of the present invention, a power management bus enters a server data processing system (e.g., via a power management communication port) and thereafter is coupled to an associated memory controller or hub. Multiple branches of the described power management bus may then be coupled with or supplied to data processing system elements or devices coupled to and/or dependent on the memory controller (e.g., system processors, bridges, or the like). Other data processing system elements (e.g., bridges) at a hierarchical level lower than or equal to that of the memory controller may then provide portions of the power management bus to all data processing system elements at successively lower levels of the described hierarchy. Such replication is continued in the described embodiment until the power management bus (and a corresponding power management command bit signal) reaches the lowest level device(s) supported.

Utilizing the structure of the described power management system, the communication of power management commands and data may be hierarchically organized. For example, in one embodiment a power management command is issued by a hierarchically highest level power management controller, (e.g., a server farm-level controller), causing a corresponding power management command bit signal to be communicated down to a power management command combination element (e.g., a rack server data processing system-level combination element or concentrator). From the power management command combination element, the power management command bit signal is forwarded or applied to a power management communication port of a server data processing system (e.g., a server data processing system module).

Within the server data processing system, the power management command bit signal is received at another power management command combination element (e.g., a server data processing system-level combination element or concentrator) which also receives a power management command bit signal encoding other power management commands from a server data processing system-level power management controller. Thereafter, the power management command bit signal is forwarded or applied to subsystem-level power management controller (e.g., a memory controller or hub implementing a power management controller according to an embodiment of the present invention) and subsequently to hierarchically lower-level elements of the system (e.g., a south bridge, an I/O bridge, connected devices). According to one embodiment, a power management command bit signal may be optionally forwarded to a connected device or system element via a connected interface or adapter.

Once received at the lowest level of the hierarchy, a power management command is utilized to control power usage of a power-managed data processing system element. If configured to self-regulate power consumption using wait states, the lowest level controlled devices may be allowed to effect power management independently. Otherwise, a power management command bit signal is distributed to a power management controller or power management command terminator one level higher than the power-managed data processing system element(s) and appropriate power management or "throttling" commands are issued on each element's behalf to control power usage and/or arbitration of associated busses.

The logic and monetary cost required to implement a hierarchal, distributed control, top-down power management systems as described herein is minimal as compared to other power management techniques. According to one embodiment of the present invention, a single signal wire per level, transmitting a signal in a single direction, a single register, a single counter and no clock sources are required for implementation. Accordingly, a power management system as described herein is amenable to being implemented cost-effectively in a wide variety and large number of electronic devices.

Figure 1A:
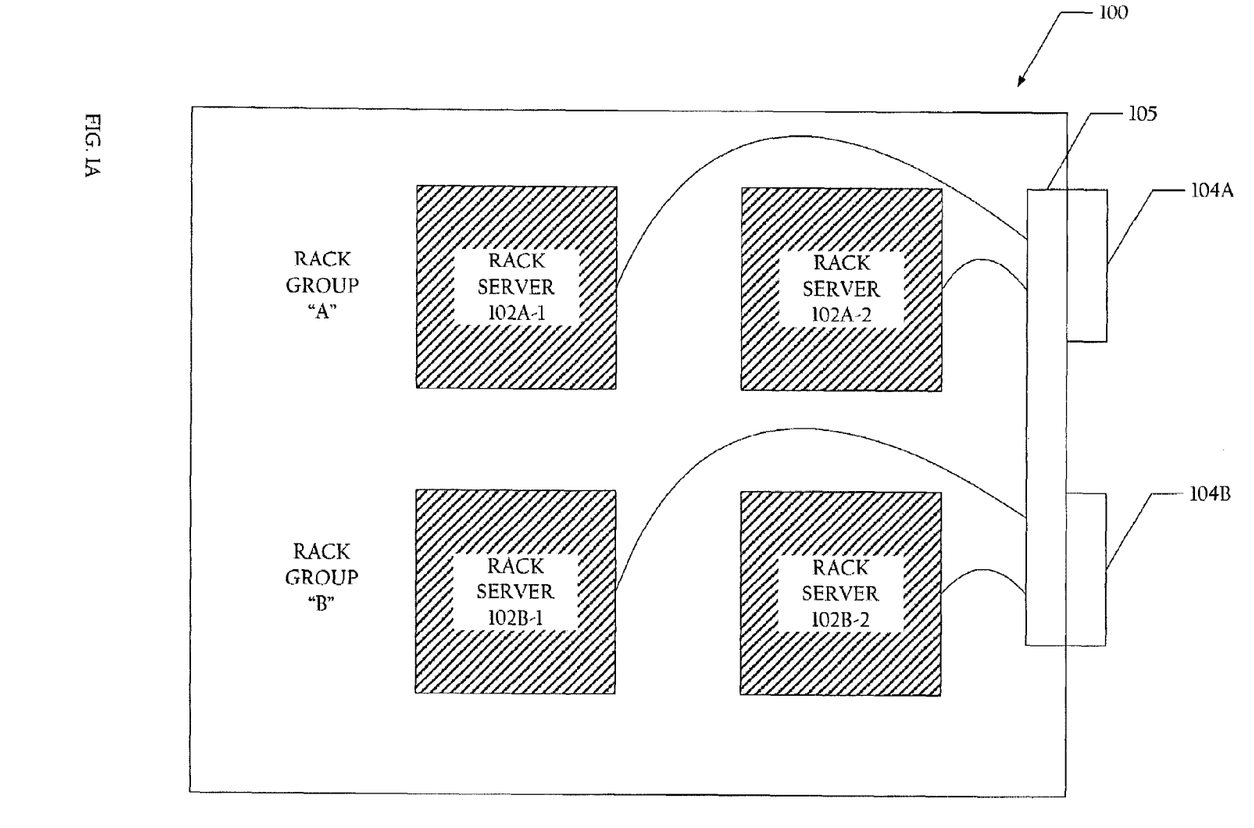
FIG. 1A is a plan view of the server farm including a plurality of rack servers and a server farm level power management controller as set forth in one or more embodiments of the present invention.

FIG. 1A is a plan view of the server farm including a plurality of rack servers as set forth in one or more embodiments of the present invention. As shown from above, server farm 100 of the illustrated embodiment of FIG. 1A includes a number of "rack groups" (e.g., rack groups "A" and "B") each including a number of server racks 102. Rack group "A" of the depicted embodiment includes rack servers 102A-1 and 102A-2 each coupled to a corresponding power source 104A via a server farm-level power management controller 105. Similarly, rack group "B" of the depicted embodiment includes rack servers 102B-1 and 102B-2 each coupled to corresponding power source 104B via server farm-level power management controller 105. In the illustrated embodiment, server farm-level power management controller 105 communicates power management data with each rack server 102 through a corresponding rack server-level power management controller (not illustrated). More specifically, server farm-level power management controller 105 obtains rack server-level power usage data and/or power management capability data, issues power management commands using power management command bit signals, and directly monitors server farm-level power usage through power sources 104.

While a particular number and configuration of rack servers has been shown in FIG. 1A for illustrative purposes, in alternative embodiments of the present invention any number of rack servers (or other groups of server data processing systems), rack groups, and power sources may be implemented. Moreover, while a direct connection of each rack server 102 to server farm-level power management controller 105 has been depicted, in other embodiments an indirect (e.g., daisy-chained) connection method may be employed.

Figure 1B:
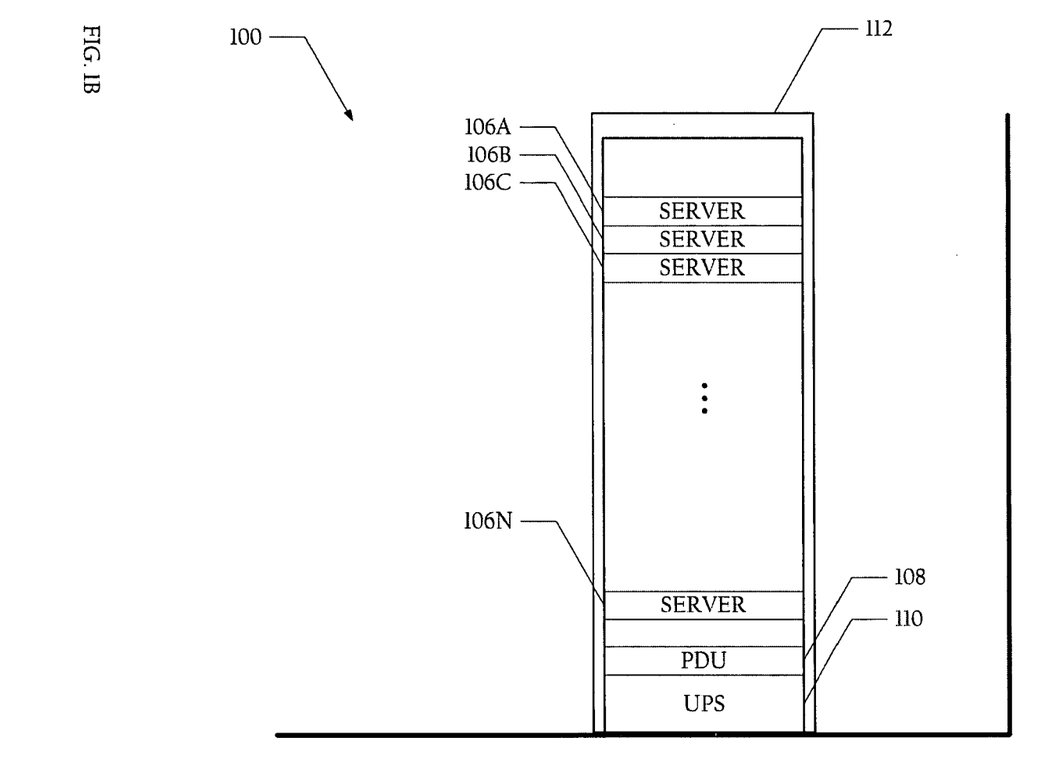
FIG. 1B is a front elevation view of a rack server of FIG. 1A.

FIG. 1B is a front elevation view of a rack server, such as rack server 102A-1 of FIG. 1A. The depicted rack server includes a plurality of server data processing systems (e.g., server data processing system modules 106A . . . 106N as shown) as well as a power distribution unit (PDU) 108 and an uninterruptible power supply (UPS) 110 disposed within a storage rack element 112. In the illustrated embodiment, server data processing system modules 106, PDU 108, and UPS 110 may be coupled with one another utilizing one or more connection media (not illustrated) within storage rack element 112. In alternative embodiments, power distribution among server data processing system modules 106A . . . 106N may be accomplished without the use of PDU 108 or UPS 110. Similarly, additional elements (e.g., input/output devices such as displays or keyboards, cooling devices, or the like) may be included within a rack server in other embodiments of the present invention.

Power distribution among server data processing system modules 106 is accomplished in the illustrated embodiment by coupling UPS 110 to a power supply (e.g., power source 104A of FIG. 1A) as well as to PDU 108. PDU 108 of the depicted embodiment is then in turn coupled to each of server data processing system modules 106A . . . 106N. To implement power management according to one embodiment of the present invention, at least one of server data processing system modules 106 is configured (e.g., activated, enabled, designated, selected or the like) as a rack server-level power management controller. In alternative embodiments of the present invention, rack server-level power management controller finctionality may be implemented within PDU 108, UPS 110, or another rack server element or module.

Figure 1C:
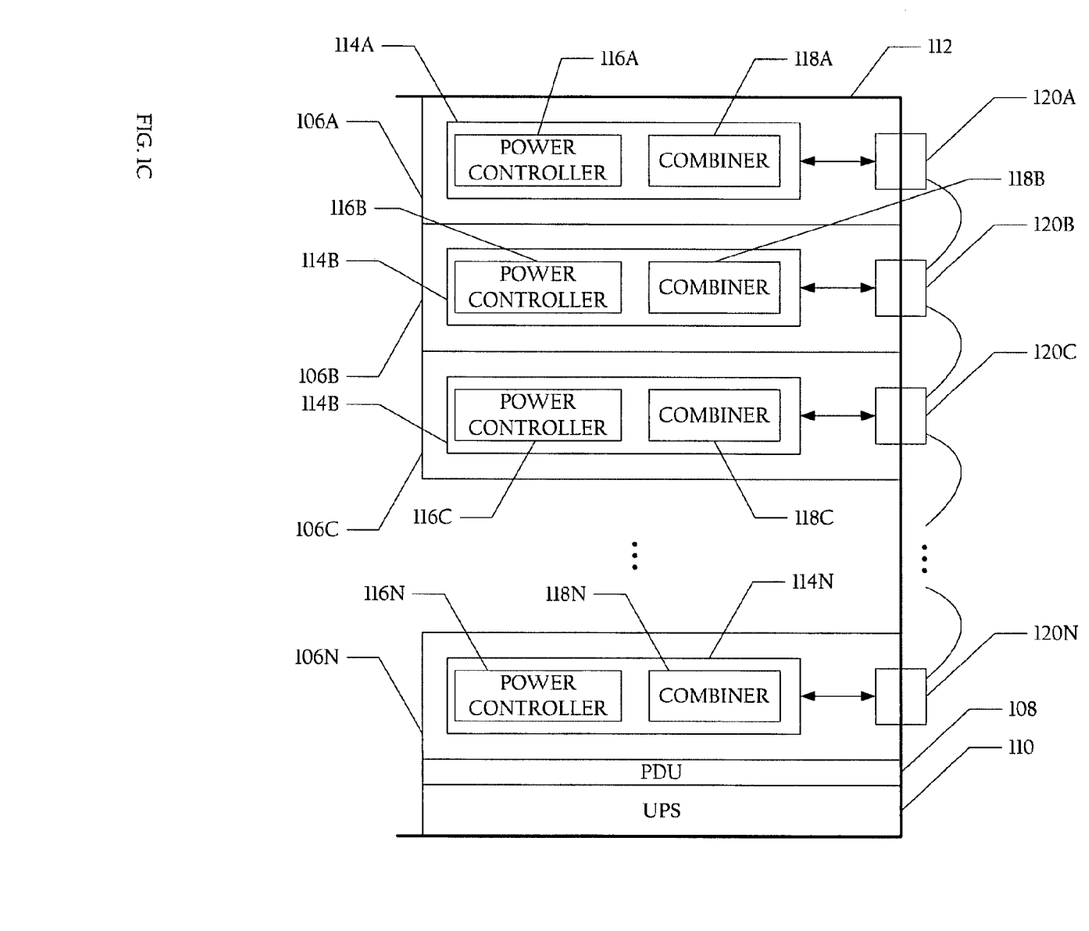
FIG. 1C is a cutaway side view of a rack server of FIG. 1A.

FIG. 1C is a cutaway side view depicting a rack server such as rack server 102A-1 of FIG. 1A. Disposed within storage rack element 112 of the illustrated rack server of FIG. 1C are each of server data processing system modules 106A . . . 106N, PDU 108, and UPS 110 as previously described herein with respect to FIGS. 1A and 1B. In the illustrated embodiment, each of server data processing system modules 106A . . . 106N includes a system management processor 114 and a power management communication port 120 coupled together as shown. Power management communication ports 120 enable server data processing system modules 106 to be communicatively coupled to one another via a communication link or media (e.g., a power management bus or portion thereof) as has been illustrated. In the depicted embodiment of FIG. 1C, a serial or "daisy chain" connection method has been implemented. In alternative embodiments however, server data processing system modules 106 may be coupled together using any of a variety of topologies (e.g., a ring, bus, star, mesh, tree, or the like) and coupling means (e.g., via optical or electromagnetic and "wired" or "wireless" connection media).

Each system management processor 114 of the illustrated rack server embodiment includes a power management controller 116 (e.g., a server data processing system-level power management controller) and a power management command combination element 118 (e.g., a concentrator or combiner).

In operation, power management controller 116 requests and receives power management data from various elements such as other server data processing system modules (in the case of a controller within a rack server-level controller-enabled system) and/or data processing system elements of an associated server data processing system and directs or manages power consumption or allocation (e.g., on a rack server or server data processing system module-level) via power management commands as further described herein. Power management command combination element 118 combines or separates power management command bit signals and/or power management commands specified by such signals. For example, in one embodiment power management command combination element 118A is utilized to combine power management commands from a hierarchically higher level power management controller (e.g., a server farm-level power management controller) and a server data processing system-level power management controller associated with storage rack element 112 (e.g., power management controller 116A). Each successive power management command combination element 118 of remaining server data processing system modules 106 is in turn utilized to combine or concentrate a "combined" power management command received via a power management bus and power management communication port with a power management command generated at or by a local power controller.

While a distinct power management communication link or port connection has been illustrated with respect to various invention embodiments herein, in an alternative embodiment such a coupling may be performed using a power management communication link which is integral with an enclosure (e.g., a storage rack element) within which one or more of server data processing systems are disposed. Consequently, each server data processing system of a power management group may be coupled to a power management communication link by insertion into an enclosure.

Figure 2:
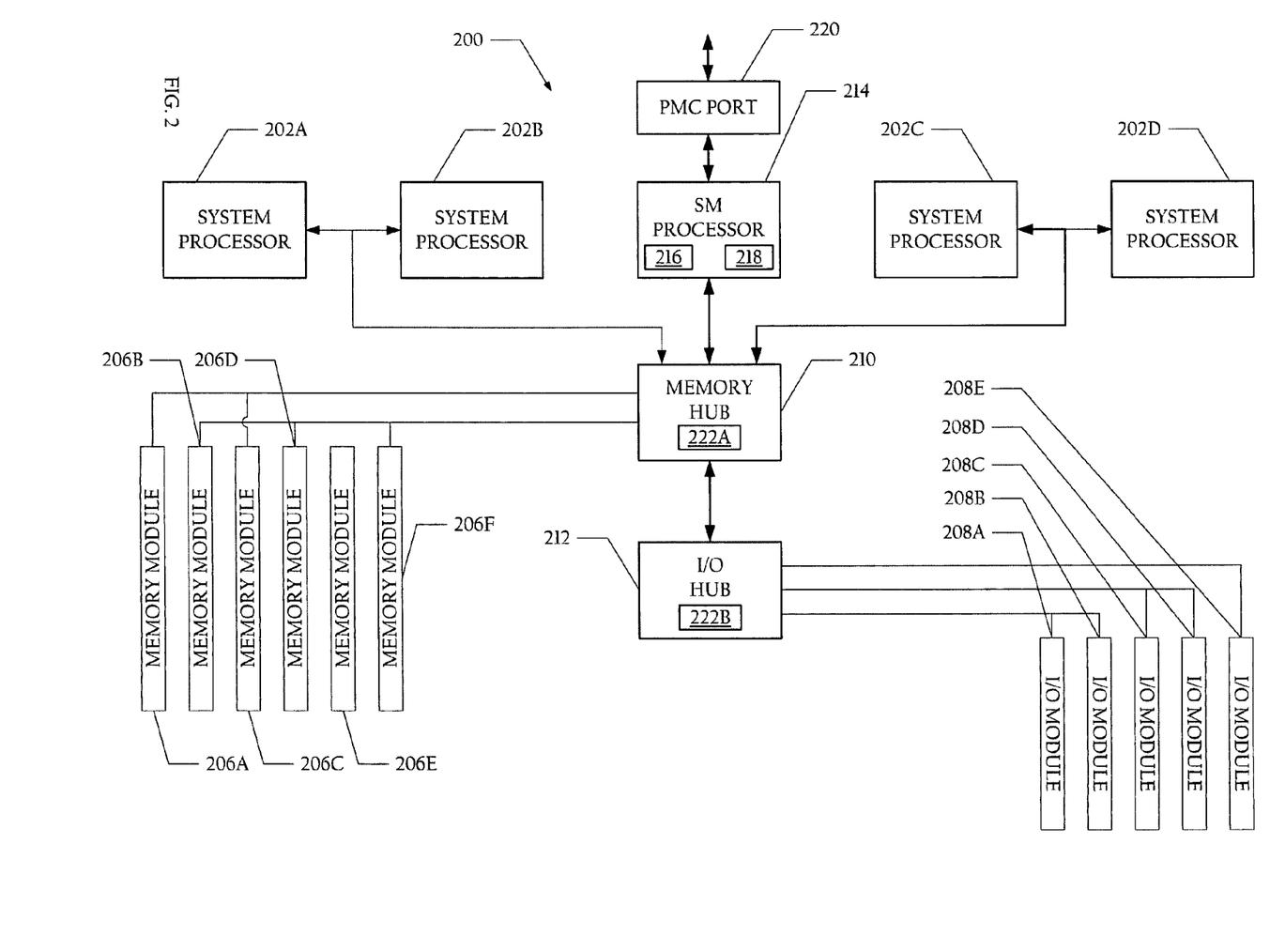
FIG. 2 is a high-level internal block diagram of a server data processing system according to an embodiment of the present invention.

FIG. 2 is a high-level internal block diagram of a server data processing system module according to an embodiment of the present invention. With reference to FIG. 2, a more detailed description of the internal components of a server data processing system module such as a component server data processing system module of rack server 102A-1 of FIG. 1A is provided. While a particular number and arrangement of elements has been illustrated with respect to server data processing system module 200 of FIG. 2, it should be appreciated that embodiments of the present invention are not limited to data processing systems having a particular number, type, or arrangement of components and so may encompass a wide variety of data processing system types, architectures, and form factors (e.g., network elements or nodes, personal computers, workstations, servers, or the like).

Server data processing system module 200 of the depicted embodiment includes a number of system processors 202A . . . 202D and a system management processor 214 coupled to memory modules 206A . . . 206F and input/output (I/O) modules 208A . . . 208E via a memory hub 210 and an I/O hub 212 as shown. Server data processing system module 200 of the illustrated embodiment further includes a power management communication port 220 as described further herein.

In the illustrated embodiment, system management processor 214 includes a power management controller 216 as well as a power management command combination element 218. While power management controller 216 and power management command combination element 218 have been depicted as separate elements, in alternative embodiments the functionality and/or structure of such elements may be further subdivided or coalesced. In the embodiment of FIG. 2, each of memory hub 210 and I/O hub 212 includes a power management command terminator 222 or "end point controller" as depicted, utilized to effect a power management command or operation and/or to place a data processing system element in a specified power management state or level responsive to the receipt of a power management command bit signal as further described herein.

More specifically, a power management command terminator 222A within memory controller or hub 210 is utilized to effect power management associated with memory modules 206. Similarly, power management command terminator 222B within I/O controller or hub 212 is utilized to effect power management associated with I/O modules 208. While hubs 210 and 212 have been illustrated and described herein as including solely power management command terminators 222, in alternative embodiments of the present invention additional logic and/or elements may be incorporated therein. For example, each of memory hub 210 and I/O hub 212 may include one or more power management controllers and/or power management command combination elements.

Memory (not illustrated) coupled with one or more memory modules 206A . . . 206F may comprise any of a number of system memory-type storage elements such as random access memory (RAM), read-only memory (ROM), flash memory, and cache. Similarly, an I/O device (not illustrated) coupled with one or more of I/O modules 208A . . . 208E may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, data processing hardware, and various processing operations further described herein. The features and process operations of the present invention may be embodied in executable instructions embodied within a machine-readable medium such as a memory coupled with a memory module of memory modules 206A . . . 206F, a storage device, a communication device or medium, or the like. A machine-readable medium may include any mechanism that provides (i.e., stores and/or transmits) data in a form readable by a machine (e.g., server data processing system module 200).

For example, a machine-readable medium may include but is not limited to: random access memory (RAM); read only memory (ROM); magnetic storage media; optical storage media; flash memory devices; or the like. The described executable instructions can be used to cause a general or special purpose processor such as one or more of system processors 202A. . . 202D, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

The present invention has been described in the context of fully functional data processing system; however, those skilled in the art will appreciate that the present invention is capable of being distributed as a program product in a variety of forms and of being applied equally, regardless of the particular type of machine-readable or signal-bearing media used to carry out the distribution. Examples of signal-bearing media include recordable media such as floppy disks and CD-ROM. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media may be used to store the modules discussed herein.

Figure 3:
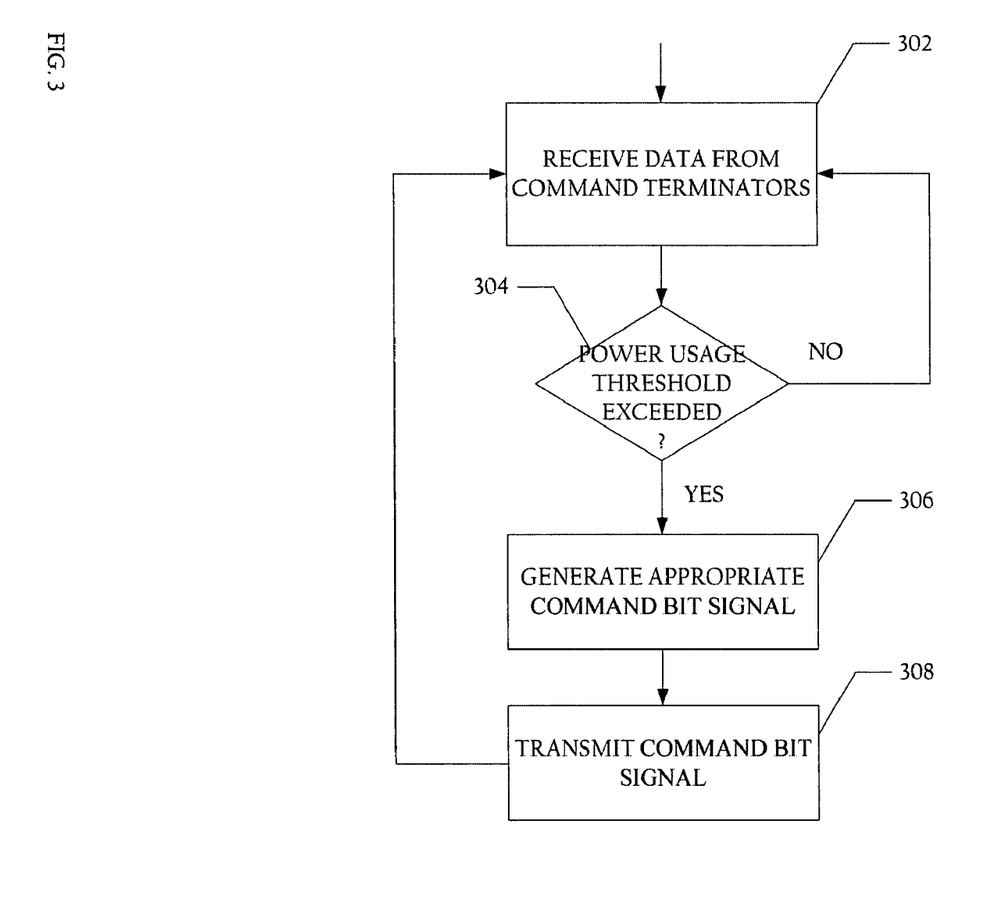
FIG. 3 illustrates a high-level flow diagram of an operational process of a power management controller according to an embodiment of the present invention.

FIG. 3 illustrates a high-level flow diagram of an operational process of a power management controller according to an embodiment of the present invention. In the illustrated process embodiment, data (e.g., power management data specifying current power usage, power management capabilities, or the like) is initially received (process block 302). Such data may be received for a particular subsystem, data processing system element, or at any other level of granularity within a power management system as described herein. Thereafter, a determination is made whether or not a predetermined power usage threshold has been exceeded (process block 304). If no predetermined power usage threshold has been surpassed, additional data (e.g., from the same or an alternate element or subsystem) is awaited.

Once a determination is made that a predetermined power usage threshold has been exceeded however, an appropriate power management command bit signal is generated (process block 306). For example, if additional throttling is required due to an assessment of current power usage, a power management command specifying an incremental increase in power management (and corresponding incremental reduction in power usage) may be encoded within a generated power management command bit signal. Thereafter in the illustrated embodiment, the generated power management command bit signal is transmitted (e.g., via an associated power management bus) to an associated power management command terminator (process block 308).

Figure 4:
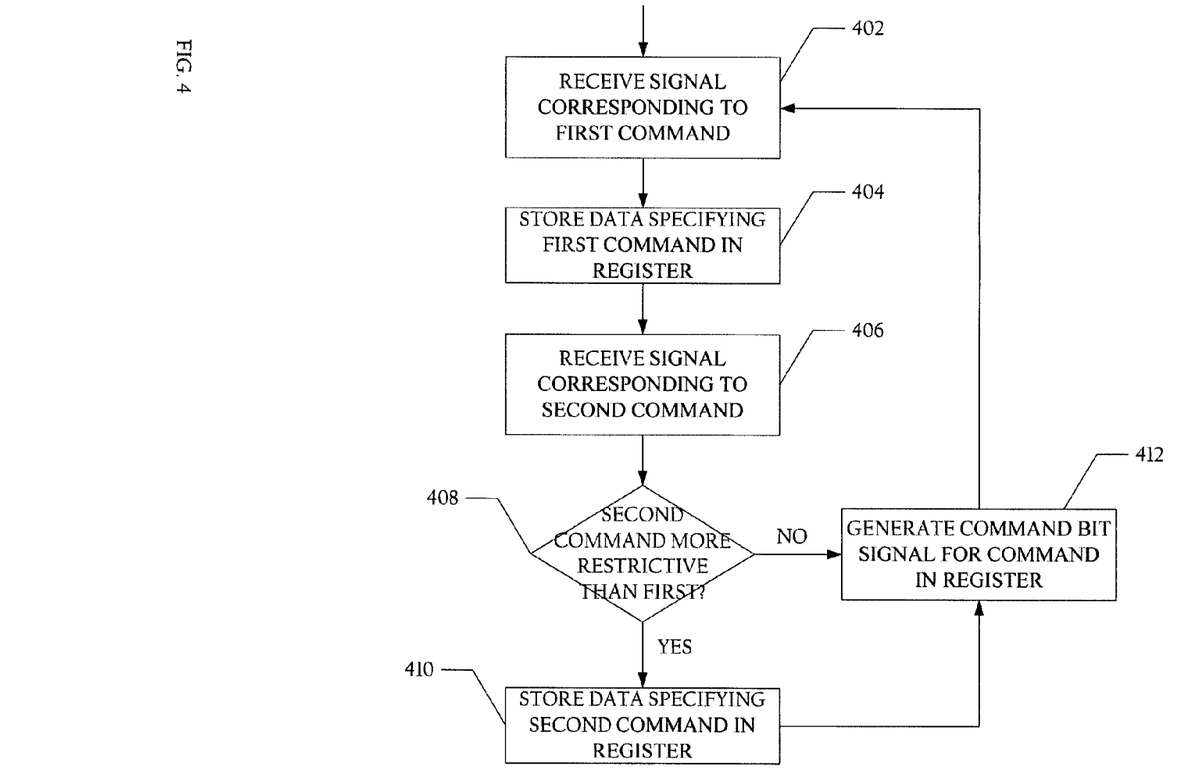
FIG. 4 illustrates a high-level flow diagram of an operational process of a command combination element according to an embodiment of the present invention.

FIG. 4 illustrates a high-level flow diagram of an operational process of a command combination element according to an embodiment of the present invention. In the depicted process embodiment, a power management command bit signal is initially received (process block 402). Data specifying a first command corresponding to the received signal is then stored in an associated register within the command combination element (process block 404). Thereafter, a power management command bit signal is received corresponding to a second power management command (process block 406). A determination is then made whether the second power management command is more power-usage restrictive than the first power management command (process block 408).

In the depicted process embodiment, the associated (power management) register within the command combination element is overwritten with data specifying the second power management command (process block 410) in response to a determination that the second power management command is the most power usage-restrictive of the two. Following a determination that the second power management command is not more power usage-restrictive than the first power management command, or once the described data has been overwritten as shown, a power management command bit signal is generated utilizing the data stored within the described register (process block 412). The illustrated process is then repeated as illustrated.

While operations corresponding to a particular power management command combination technique have been illustrated and described herein with respect to FIG. 4, in alternative embodiments a number of variations are contemplated. For example, power management command bit signals may be received substantially simultaneously rather than in a serial manner as illustrated. Similarly, while use of a single register and overwriting technique has been described with respect to the illustrated embodiment, separate registers or other storage elements along with selection logic or comparison logic in the absence of registers may be used to avoid the loss or corruption of previously-stored data. Moreover, while a most/least power-usage restrictive comparison has been shown in FIG. 4, other comparison or selections metrics may be used to "combine" power management commands or corresponding command bit signals in alternative embodiments.

Figure 5:
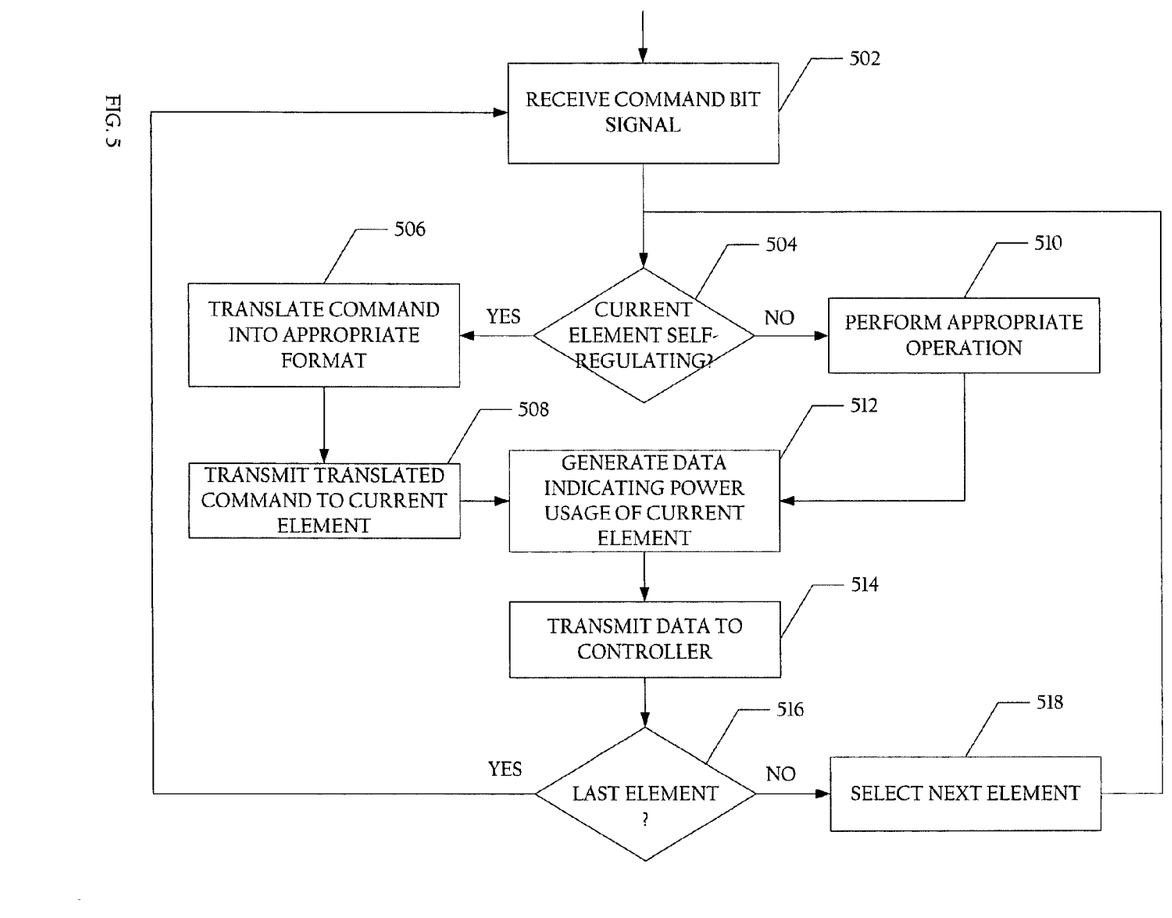
FIG. 5 illustrates a high-level flow diagram of an operational process of a power management command terminator according to an embodiment of the present invention.

FIG. 5 illustrates a high-level flow diagram of an operational process of a power management command terminator according to an embodiment of the present invention. In the illustrated process embodiment, a power management command bit signal is initially received (process block 502). A determination is then made whether a data processing system element being currently processed or managed is capable of self-regulating power usage (process block 504). One example of a self-regulating system element is a system processor provided with a proprietary means to throttle performance and power usage as previously described herein. If the current data processing system element is identified as being capable of self-regulation, a power management command corresponding to the received command bit signal is translated or converted into an appropriate format (e.g., a corresponding proprietary power management command) (process block 506). The translated command is then transmitted to the current element to be performed (process block 508).

In response to a determination that a currently-managed element is not configured for self-regulation, an appropriate power management operation (e.g., a throttling operation, voltage reduction, or the like) commensurate with the received power management command bit signal is performed (process block 510). Following such a performance or transmission of a translated command (process block 508), data indicating the power usage of the currently-managed data processing system element is generated (process block 512). Such power usage data may be generated by the managed element utilizing any of a number of techniques. The generated power usage data is then transmitted to an associated power management controller (process block 514).

Once the generated power usage data has been transmitted, a determination is made whether the currently-managed data processing system element is the final element managed by a power management command terminator performing the illustrated process embodiment (process block 516). If a determination is made that elements to be managed remain, a next element to be managed or processed is selected (process block 518). Otherwise, a next power management command bit signal to be received is awaited (process block 502) before the illustrated method embodiment is repeated as indicated.

Figure 6:
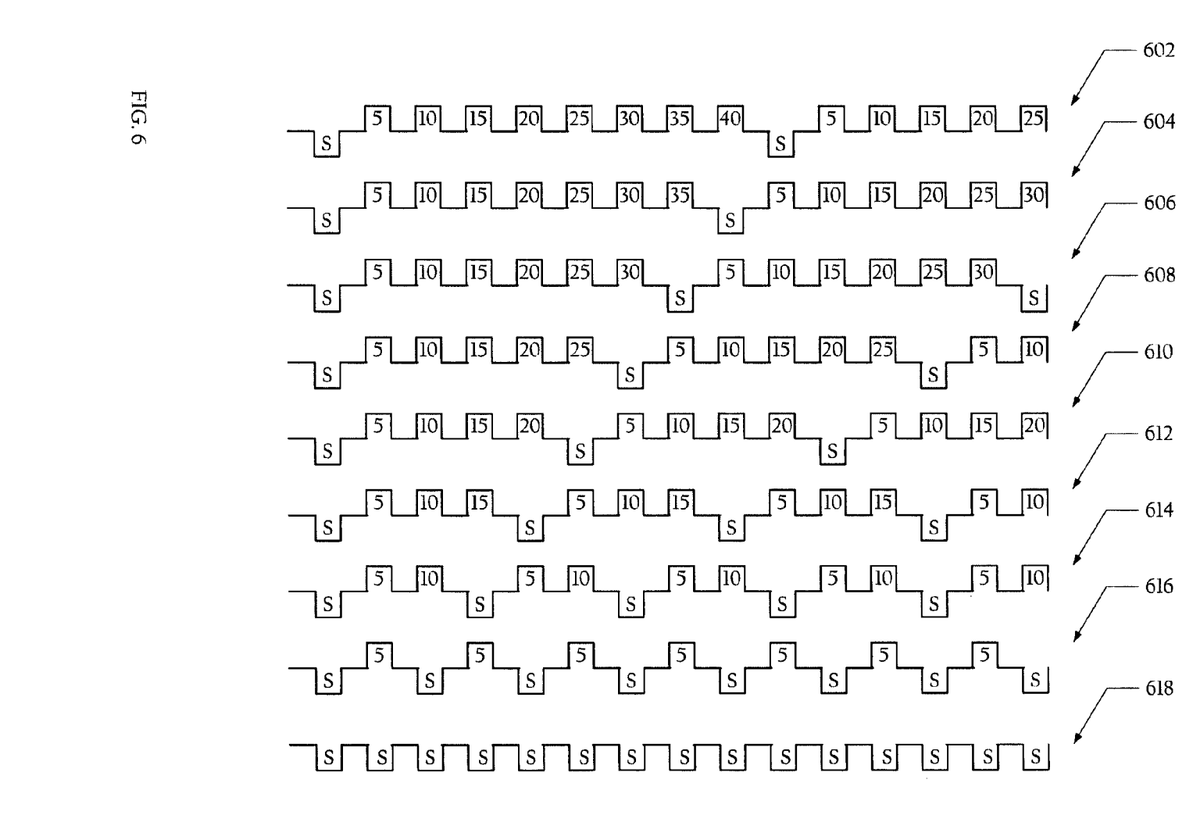
FIG. 6 illustrates power management command bit signal values corresponding to various power management commands according to an embodiment of the present invention.

FIG. 6 illustrates power management command bit signal values corresponding to various power management commands according to an embodiment of the present invention. In the illustrated embodiment, a power management bus comprising a single bit and/or a single signal wire to convey power management commands is shown. According to the depicted embodiment, a power management signal may assume one of three states. For example, in the embodiment of FIG. 6, a reference voltage, a voltage below the reference voltage, and a voltage above the reference voltage have been depicted.

In the illustrated embodiment, the leading edge of a voltage below the reference voltage is utilized to indicate the start of a command signal transmission (indicated by the "S" signal value). The leading edge of a voltage above the reference voltage represents a count element of a power management command which is used to encode the command itself The reference voltage is used to separate start count and command count elements. FIG. 6 illustrates each of a number of commands required by one embodiment to enable a reduction in power usage in increments of 5 percent from no reduction (signal example 618) down to a 40 percent reduction (signal example 602). In other embodiments of the present invention, additional power management commands signal values, extra signal wires, ports, additional devices and functions may be implemented.

Although the flow diagrams depicted in FIGS. 3-5 indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, addition process operations may be added where necessary in alternative embodiments of the present invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A hierarchical power management system comprising:
a first power management controller;
a second power management controller;
a power management command combination element;
a power management command terminator;
a power-managed data processing system element; and
a power management bus coupled between said first power management controller, said second power management controller, said power management command combination element, and said power management command terminator, wherein said power management command combination element is configured to combine respective commands received from said first and second power management controllers and provide a combined power management command to said power management command terminator, and wherein said combined power management command corresponds to a most power usage restrictive command included within the respective commands.

2. The hierarchical power management system of claim 1, wherein said power management bus is configured to unidirectionally transmit a single power management command bit signal from at least one of said first power management controller and said second power management controller to said power management command terminator.

3. The hierarchical power management system of claim 1, wherein said first power management controller is associated with a first power management hierarchical level and said second power management controller is associated with a second power management hierarchical level.

4. The hierarchical power management system of claim 1, wherein said first power management controller is associated with a server farm comprising a rack server data processing system and said second power management controller is associated with said rack server data processing system.

5. The hierarchical power management system of claim 1, wherein said power management command combination element is configured to receive a first signal specifying a first power management command from said first power management controller, to receive a second signal specifying a second power management command from said second power management controller, to generate a combined power management command utilizing said first power management command and said second power management command, and to transmit a single power management command bit signal specifying said combined power management command to said power management command terminator.

6. The hierarchical power management system of claim 1, wherein:
said power management bus comprises a primary power management bus, and
said hierarchical power management system further comprises a secondary power management bus coupled between said first power management controller, said second power management controller, said power management command combination element, and said power management command terminator.

7. A method for managing power usage within a hierarchical power management system comprising a first power management controller, a second power management controller, and a power management command combination element, said method comprising:
generating a first power management command bit signal utilizing said first power management controller, wherein said first power management controller is associated with a first power management hierarchical level;
generating a second power management command bit signal utilizing said second power management controller, wherein said second power management controller is associated with a second power management hierarchical level;
combining said first power management command bit signal and said second power management command bit signal utilizing said power management command combination element to provide a combined power management command bit signal that corresponds to a most power usage restrictive command bit signal included within said first and second power management command bit signals; and
performing a power management operation on a power-managed data processing system element associated with said hierarchical power management system in response to said combining.

8. The method of claim 7, wherein said generating said first power management command bit signal comprises generating a server farm-level command bit signal.

9. The method of claim 7, wherein said generating said second power management command bit signal comprises generating a rack server-level command bit signal.

10. The method of claim 7, wherein
said hierarchical power management system further comprises a power management command terminator and a power management bus, and
said method further comprises
transmitting said first power management command bit signal to said power management command combination element utilizing said power management bus; and
transmitting said second power management command bit signal to said power management command combination element utilizing said power management bus.

11. The method of claim 10, wherein said power management bus comprises a unidirectional, single bit bus.

12. The method of claim 7, wherein
said first power management command bit signal is associated with a first power management command,
said second power management command bit signal is associated with a second power management command, and
said combining comprises
generating a combined power management command utilizing said first power management command and said second power management command.

13. The method of claim 12, wherein said performing comprises performing said combined power management command.

14. A machine-readable medium having a plurality of instructions executable by a machine embodied therein, wherein said plurality of instructions when executed cause said machine to perform a method for managing power usage within a hierarchical power management system comprising a first power management controller, a second power management controller, and a power management command combination element, said method comprising:

generating a first power management command bit signal utilizing said first power management controller, wherein said first power management controller is associated with a first power management hierarchical level;

generating a second power management command bit signal utilizing said second power management controller, wherein said second power management controller is associated with a second power management hierarchical level;

combining said first power management command bit signal and said second power management command bit signal utilizing said power management command combination element to provide a combined power management command bit signal that corresponds to a most power usage restrictive command bit signal included within said first and second power management command bit signals; and performing a power management operation on a power-managed data processing system element associated with said hierarchical power management system in response to said combining.

15. The machine-readable medium of claim 14, wherein said generating said first power management command bit signal comprises generating a server farm-level command bit signal.

16. The machine-readable medium of claim 14, wherein said generating said second power management command bit signal comprises generating a rack server-level command bit signal.

17. The machine-readable medium of claim 14, wherein said hierarchical power management system further comprises a power management command terminator and a power management bus, and said method further comprises transmitting said first power management command bit signal to said power management command combination element utilizing said power management bus; and transmitting said second power management command bit signal to said power management command combination element utilizing said power management bus.

18. The machine-readable medium of claim 17, wherein said power management bus comprises a unidirectional, single bit bus.

19. The machine-readable storage medium of claim 14, wherein said first power management command bit signal is associated with a first power management command, said second power management command bit signal is associated with a second power management command, and said combining comprises generating a combined power management command utilizing said first power management command and said second power management command.

20. The machine-readable storage medium of claim 19, wherein said performing comprises performing said combined power management command.

* * * * *